J. B. PLACE.

Improvement in Plow-Cleaners.

No. 132,857.            Patented Nov. 5, 1872.

UNITED STATES PATENT OFFICE.

JOHN B. PLACE, OF AUBURN TOWNSHIP, SUSQUEHANNA COUNTY, PA.

IMPROVEMENT IN PLOW-CLEANERS.

Specification forming part of Letters Patent No. 132,857, dated November 5, 1872.

*To all whom it may concern:*

Be it known that I, JOHN B. PLACE, of Auburn township, in the county of Susquehanna and in the State of Pennsylvania, have invented certain new and useful Improvements in Attachments to Plow to remove obstructions from its front or shin; and do hereby declare that the following is a full, clear, and exact description thereof, reference being had to the accompanying drawing and to the letters of reference marked thereon making a part of this specification.

The nature of my invention consists in the construction and arrangement of a device to be attached to any plow for removing obstructions from the shin or standard of the same, as will be hereinafter more fully set forth.

In order to enable others skilled in the art to which my invention appertains to make and use the same, I will now proceed to describe its construction and operation, referring to the annexed drawing, in which—

Figure 1:
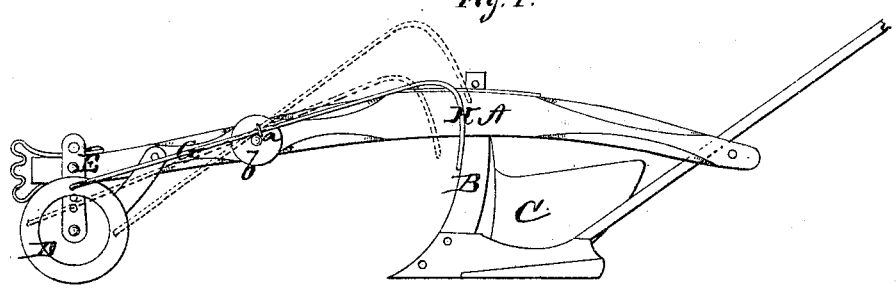
Figure 2:
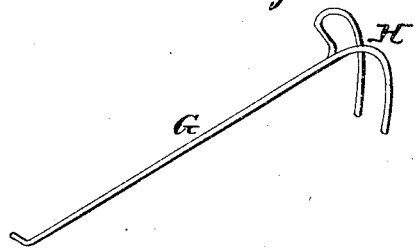

Figure 1 is a side elevation of a plow with my device attached, and Fig. 2 is a perspective view of a part of my device.

A represents a plow-beam, and B the shin or standard, to which the mold-board C and land-side are attached. At the front end of the beam A is a movable or adjustable support, E, carrying the gage-wheel D. These parts are constructed in any of the known and usual ways, and I lay no claim to the same only in so far as the wheel D is used to operate my device. At a suitable distance from the center, in the wheel D, is pivoted a rod, G, either by a wrist-pin or other convenient means, and this rod passes through a swivel-eye, $a$, attached to a disk or plate, $b$, secured on the side of the plow-beam A. At the rear end of the rod G is attached or formed a two-tined fork, H, which straddles the beam A. When the plow is moving the wheel D draws the rod and fork forward, the tines removing all obstructions from the shin or standard B, and on its backward movement the fork is raised above the obstructions and drops directly behind, when it is again ready for work. The disk $b$ may be loosened so as to turn on its center and raise or lower the swivel-eye $a$, thereby adjusting the rod G up or down as required.

Having thus fully described my invention, what I claim as new, and desire to secure by Letters Patent, is—

The combination, with a plow having beam A, standard B, and wheel D, of the rod G having a hook at its front end and its rear end forked to straddle the plow-beam, adjustable disk $b$, and swivel-eye $a$, all substantially as and for the purposes set forth.

In testimony that I claim the foregoing I have hereunto set my hand this 30th day of July, 1872.

JOHN B. PLACE.

Witnesses:
A. N. MARR,
F. J. FURMAN.